Nov. 4, 1924.
1,514,183
C. W. STEELE ET AL
MACHINE FOR MAKING HOLLOW RUBBER ARTICLES
Filed June 19, 1922     10 Sheets-Sheet 3

Inventors:
Charles W. Steele,
Richard T. Griffiths,
by Spear Middleton Donaldson & Hall
Attys.

Nov. 4, 1924.

C. W. STEELE ET AL 1,514,183

MACHINE FOR MAKING HOLLOW RUBBER ARTICLES

Filed June 19, 1922  10 Sheets-Sheet 6

Inventors:
Charles W. Steele, &
Richard T. Griffiths,
by Spear Middleton Donaldson & Hall
Attys.

Nov. 4, 1924.

C. W. STEELE ET AL 1,514,183

MACHINE FOR MAKING HOLLOW RUBBER ARTICLES

Filed June 19, 1922   10 Sheets-Sheet 8

Inventors:
Charles W. Steele,
Richard T. Griffiths,
by *Spear Middleton Donaldson & Hull*
Attys.

Nov. 4, 1924.  
C. W. STEELE ET AL  
1,514,183  
MACHINE FOR MAKING HOLLOW RUBBER ARTICLES  
Filed June 19, 1922   10 Sheets-Sheet 9
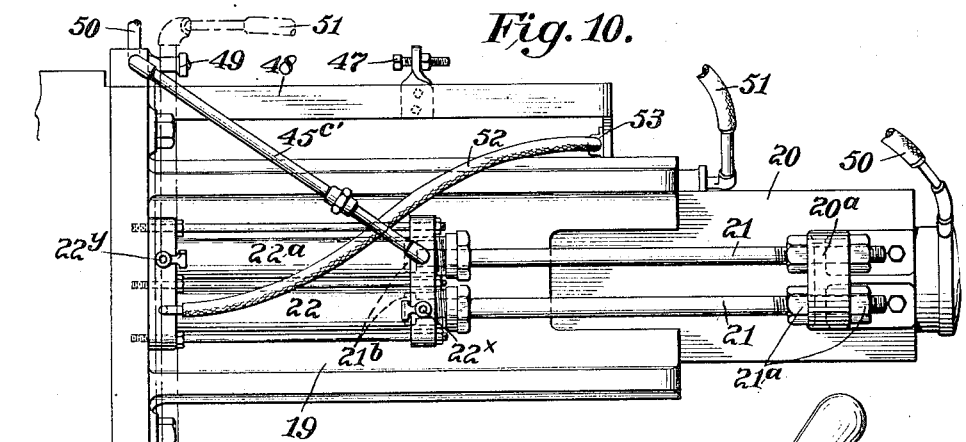
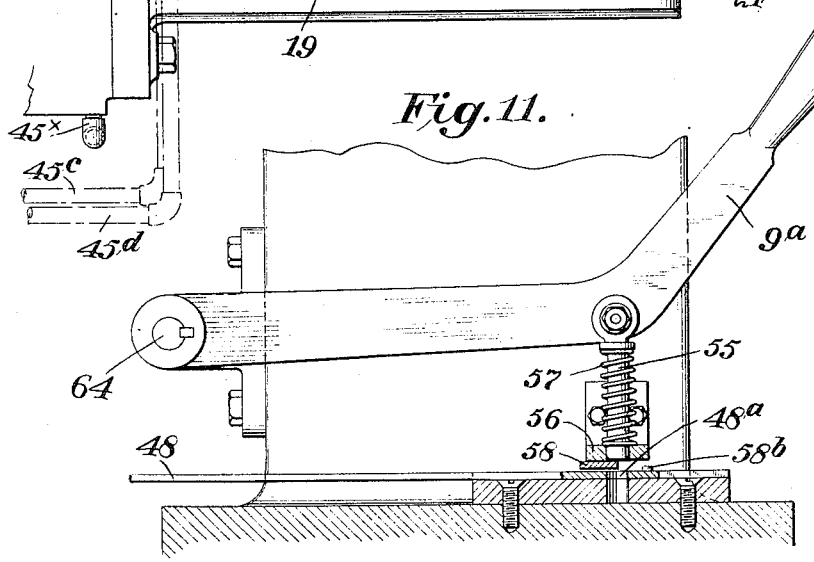
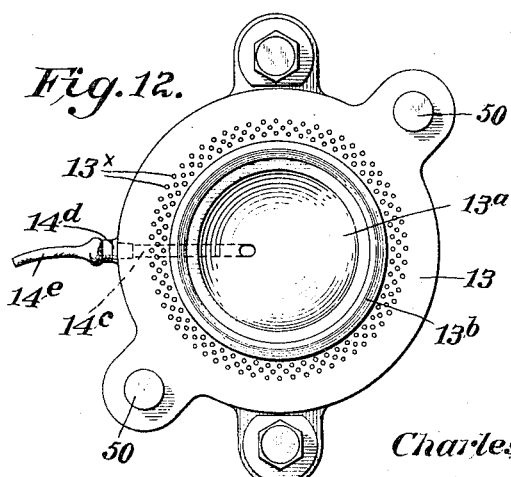
Inventors:  
Charles W. Steele,  
Richard T. Griffiths,  
by *Spear Middleton Donaldson & Hull*  
Attys.

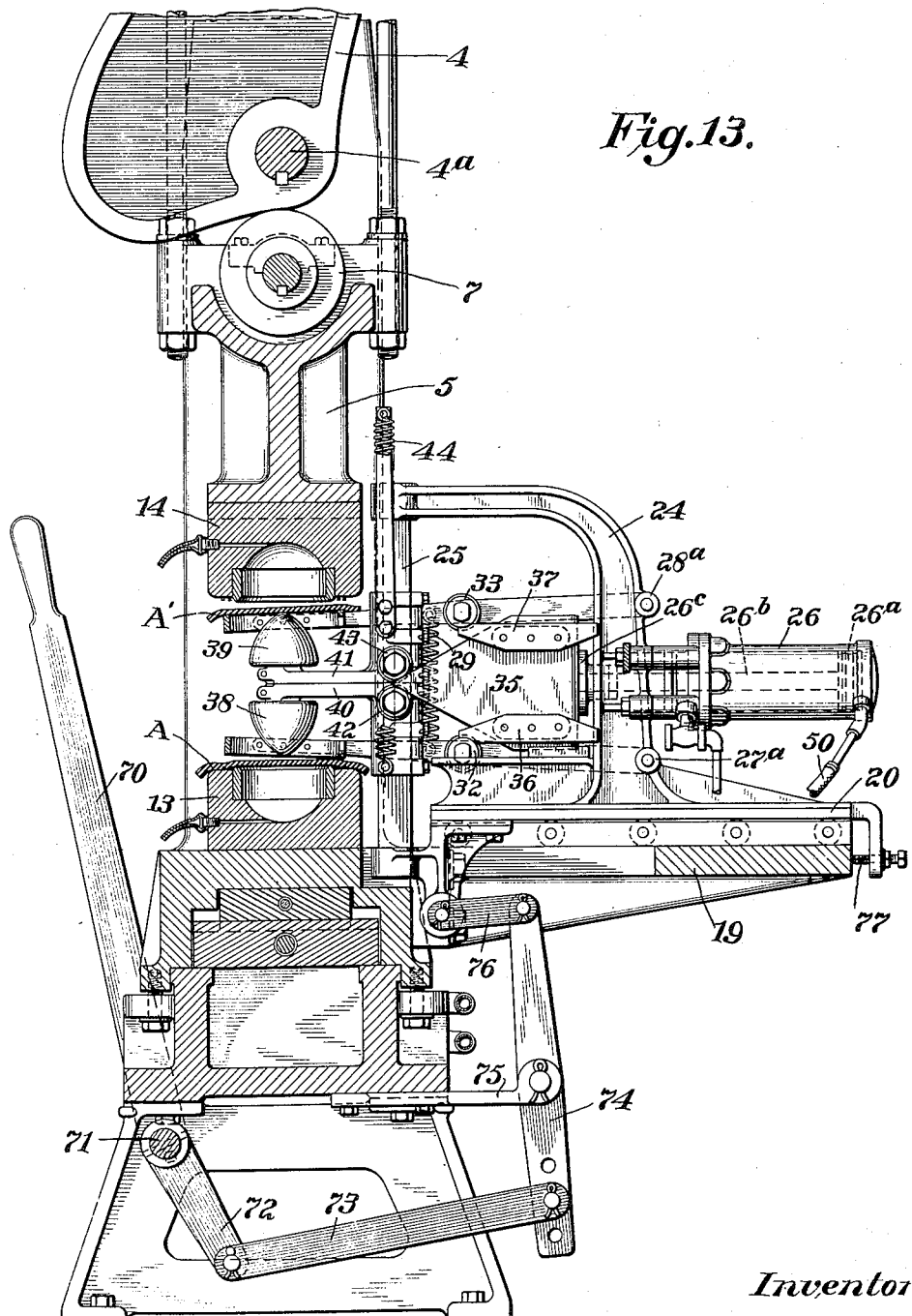

Patented Nov. 4, 1924.

1,514,183

UNITED STATES PATENT OFFICE.

CHARLES W. STEELE AND RICHARD T. GRIFFITHS, OF AKRON, OHIO, ASSIGNORS TO THE MILLER RUBBER COMPANY, OF AKRON, OHIO, A CORPORATION OF OHIO.

MACHINE FOR MAKING HOLLOW RUBBER ARTICLES.

Application filed June 19, 1922. Serial No. 569,493.

*To all whom it may concern:*

Be it known that we, CHARLES W. STEELE, and RICHARD T. GRIFFITHS, citizens of the United States, and residents of Akron, in the county of Summit and State of Ohio, have invented certain new and useful Improvements in Machines for Making Hollow Rubber Articles, of which the following is a specification.

Our present invention relates to improvements in apparatus designed for use in the manufacture of hollow articles from plastic sheets such for example as rubber playing balls, and pertains to the type in which cupped discs of plastic material are simultaneously severed from juxtaposed sheets and joined together at their edges, the ball thus formed being subsequently placed in a suitable mold and vulcanized, being preferably expanded or inflated during vulcanization by the insertion between the cupped blanks prior to their being joined together, of a gas forming substance which is gasified by the vulcanizing heat. The apparatus disclosed in this application is well adapted for carrying out the process disclosed in a companion application filed by us of even date herewith, Serial No. 569,492.

The invention has among its objects to provide a means or apparatus by which articles of high grade and uniform character may be rapidly and economically made, and the invention includes the novel features of construction and arrangement and combination of parts hereinafter described and the novel method of procedure, the nature and scope of our invention being particularly defined by the appended claims.

What we at present consider the preferred embodiment of our invention is illustrated in the accompanying drawings in which:—

Figure 1 is an elevation, partly broken away, of the left-hand side of our improved machine.

Fig. 1ª is a sectional detail of the control valve.

Fig. 10 is a detail view showing the fluid pressure operating cylinders and connections, being a fragmentary bottom plan view.

Fig. 11 is a detail view (in side elevation) of the operating lever and locking means, partly in section.

Fig. 12 is a plan or face view of one of the dies, and

Fig. 13 is a sectional elevation illustrating a modification in which the former carriage is hand operated.

Figure 1:
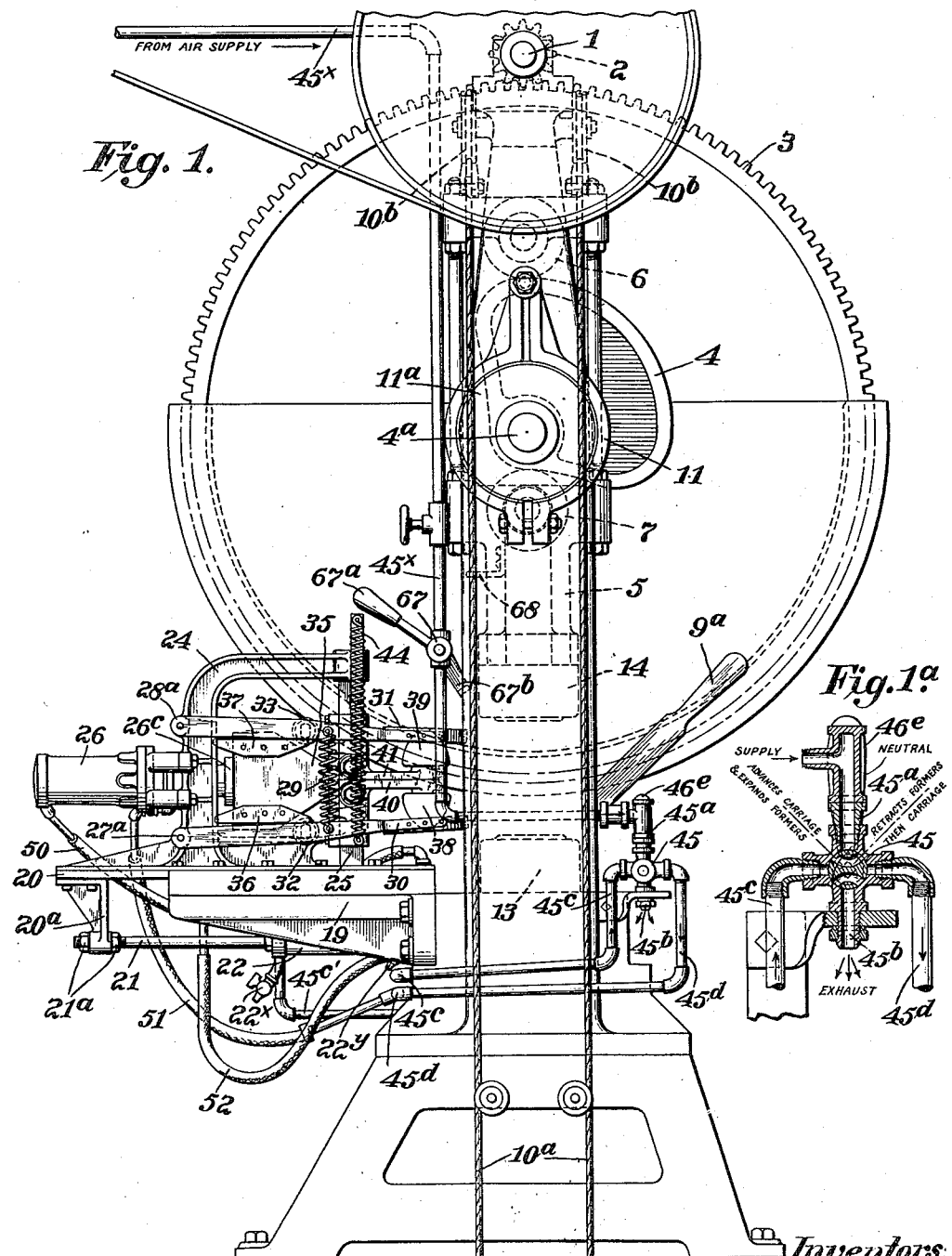

While we have shown and described herein a machine designed especially for making playing balls it will be understood that we do not limit ourselves to this specific article, the shape of which can readily be varied by changing the shape of the die cavities.

In these drawings the same reference characters indicate similar or like parts wherever used.

The machine includes a die press for dieing out and uniting the edges of articles or ball sections, or discs, and such press comprises stationary and reciprocating die blocks, or members, 13 and 14 respectively, the latter being operated from power shaft 1 through suitable gears 2 and 3, the latter of which drives a shaft 4ª through a controlling clutch 9 operated by a hand lever 9ª in the manner hereinafter described. Shaft 4ª carries a cam 4 which works between upper and lower rollers 6 and 7 carried by a ram 5 reciprocating in guides 8. The ram may be counterbalanced by a weight 10 supported from cables 10ª passing over pulleys 10ᵇ and a brake 11 is provided cooperating with a brake drum 11ª to insure quick stoppage of the press when the clutch is thrown out, it being understood that gear 3 is driven continuously.

The die blocks 13 and 14 are provided with die cavities 13ª and 14ª respectively (see Figs. 5, 6 and 7) into which the corresponding portions of the blanks A and A' are to be forced in the manner hereinafter described to cup the blanks and form article sections, and cooperating die rings 13ᵇ and 14ᵇ are provided, which are set or forced into the cylindrical portions of the die cavities, the rings being projected beyond the faces of the die blocks sufficiently to give clearance to the rubber, and such projected portions having blunt or broad wedge-shaped (in cross section) edges which simultaneously sever the disc from the blank and unite said edges together as the dies approach each other in the manner well understood by those skilled in the art. In order to prevent injury to the cutting rings which have a comparatively small area, we provide fixed stops or abutments as shown at 50 (see Fig. 12).

For cupping the blanks we use a pair of plungers 38 and 39 and we have found that the best results are secured if these plungers are of a special shape, and the die cavities are of such size that the cupped portions of the blanks are not forced into contact with or do not touch the walls of the die cavities. Preferably the forming or cupping plungers are of the shape shown, to wit, each is somewhat similar in shape to the pointed or sharper end portion of an egg.

Figure 6:
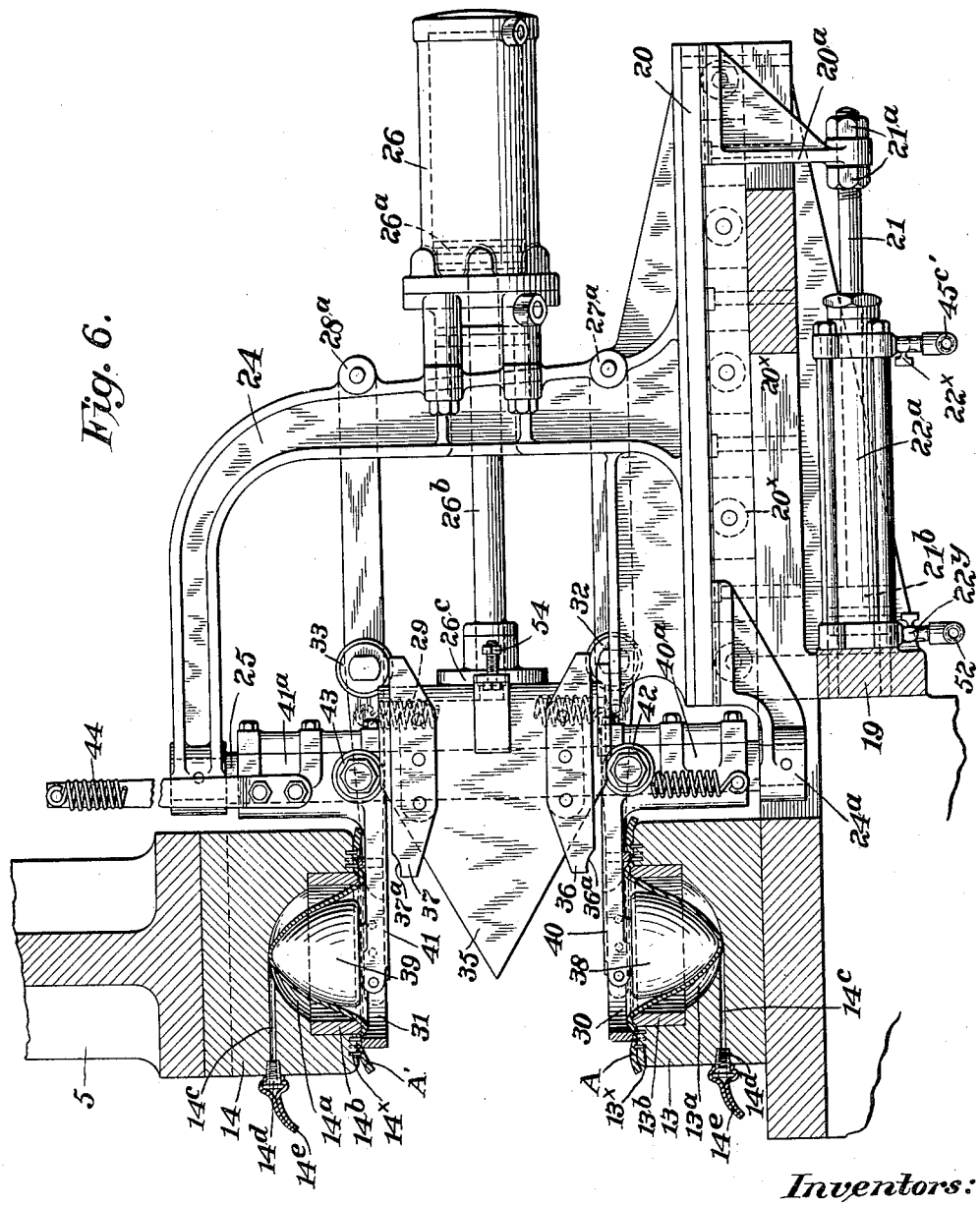
Fig. 6 is a similar view showing the formers in expanded or separated position.

The blanks are preferably formed only slightly larger than the discs to be severed therefrom, so as to reduce the amount of scrap. Such blanks are held across the die cavities by the clamping rings 30 and 31 during the time the plungers or shapers are operated to press the intermediate portions of the sheets into the die cavities, the clamping rings having an internal diameter exceeding the external diameter of the die rings so that the margins of the blanks are pressed against the faces of the die blocks outside the die rings, as shown in Fig. 6. The walls of these cavities are not designed to come in contact with the rubber or to serve in any way to shape the cupped portions, this being accomplished solely by the action of the formers or plungers on the portions of the sheets lying within the clamping rings, and to this end each cavity is made large enough so that no part of the cupped portion of the sheet will contact with the wall thereof. Preferably the bottom of each cavity is rounded so as to conform approximately to the shape of the former and reduce the amount of air space between the exterior surface of the cupped portion of the sheet and the wall of the die cavity. The result of this is that the apex of each former contacts first with the center of the disc and as the former penetrates further into the die cavity there is a progressive contact. It follows therefore that the portions which primarily and successively touch the former are precluded from any subsequent stretch, all stretch being confined to the gradually decreasing portion between the formers and the edges of the die rings 13ᵇ and 14ᵇ, and by reason of the shape of former used and the manner of action, a uniform thickness of each sheet is maintained.

Figure 7:
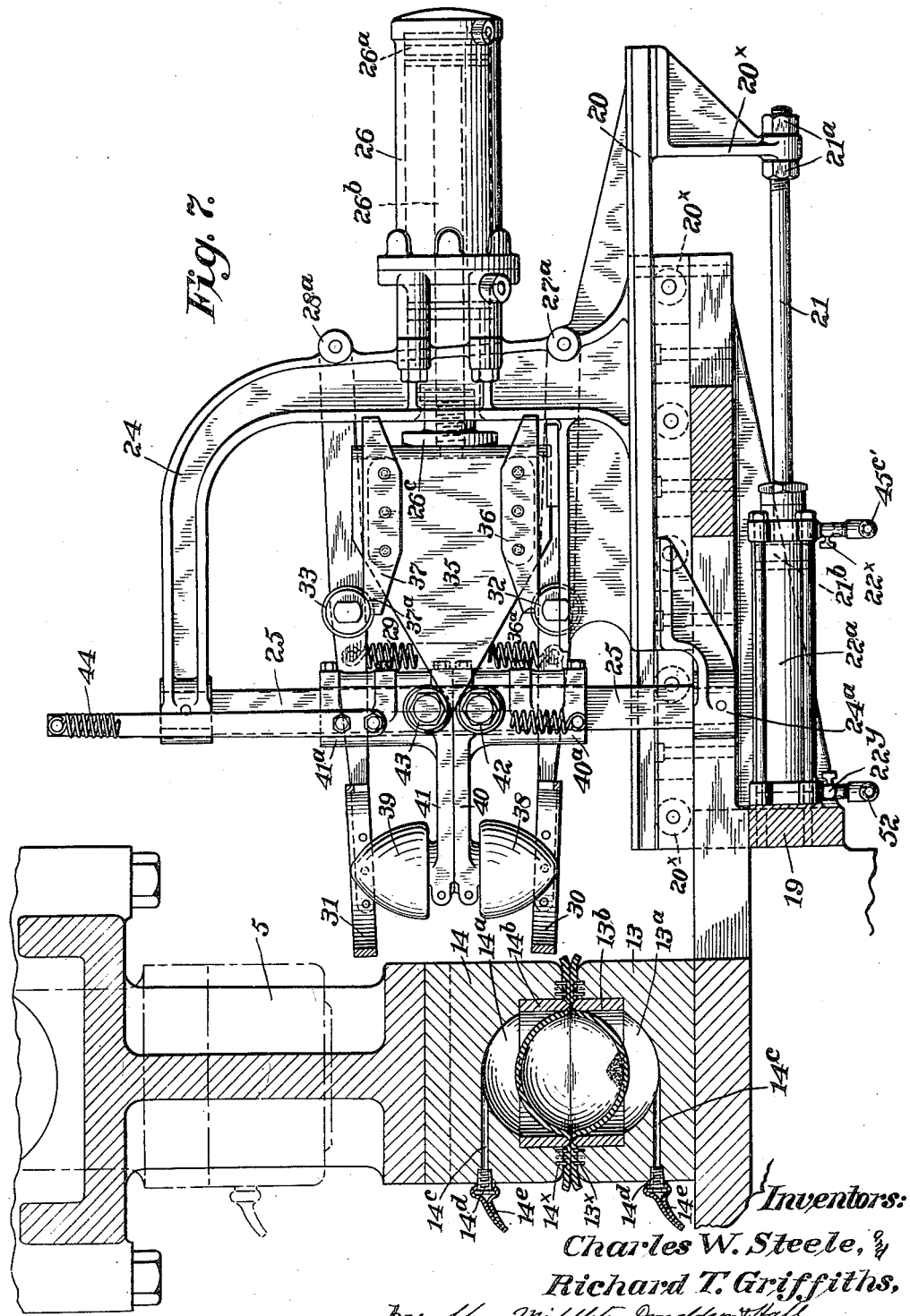
Fig. 7 is a similar view with the parts in the position assumed after the carriage has been retracted to withdraw the former and the dies have come together.
Figure 8:
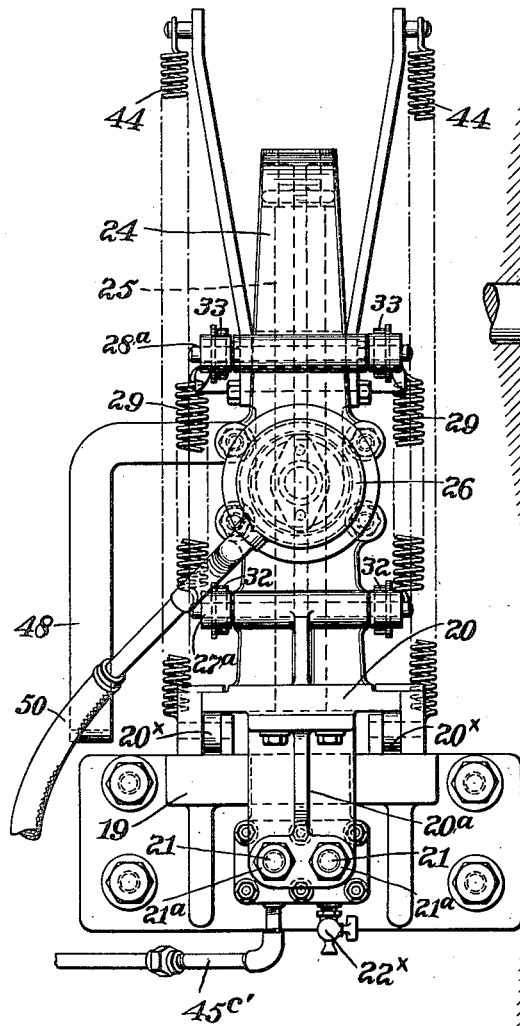
Fig. 8 is a detail view showing the carriage and associated parts in rear elevation.

Another advantage which we secure from the shape of formers used is that we are enabled to so manipulate the ball in the mold that all danger of rupturing the seam or joint is avoided. It will be observed that the ball formed by joining the cupped sections and before vulcanizing is not a true sphere, but is rather an oblate spheroid with its polar diameter very much shorter than its equatorial diameter, the equator being represented by the line of juncture, as shown in Fig. 7. The result of this is that when the oblate spheroid is placed in the spherical curing mold cavity and expansion takes place, as the equatorial diameter is made to very closely approximate the interior diameter of the mold the seam portion quickly contacts with the mold wall whereas the polar regions are the last to contact.

We find the best results are secured by making the seam or equatorial diameter a little greater than the diameter of the mold cavity, and this we can easily do without danger where the article is placed in the mold with the seam at an angle to the mold parting, though were the seam in line with such parting pinching would occur in closing the mold.

By making the seam diameter slightly greater than the corresponding mold diameter the seam is actually placed under compression, and as the polar regions expand they have a tendency to decrease the seam diameter. This further removes danger of bursting or rupturing the seam.

In placing the balls in the mold the equators are preferably placed perpendicular to the parting line of the mold, so that the seam does not coincide with the parting line and liability of bursting or rupture of the seam is further reduced.

An air escape port 14ᶜ is provided in each die block to permit the air to pass out as the sheet is forced into the cavity by the plunger, and this escape port is provided with a delicate, or sensitive, check valve, preferably in the form of a small tube 14ᵈ carrying a piece of rubber tubing 14ᵉ having its end cured in flattened condition. This check valve prevents the re-entry of air and thus causes the sheet or blank to be held in cupped shape by atmospheric pressure when the plungers or formers are removed as hereinafter described.

It will be understood that the sheets or blanks do not remain in exactly the shape to which they are forced or cupped by the plungers. Unvulcanized rubber is, even when compounded with other materials, of a more or less resilient or elastic nature, though not, of course, to the same extent as vulcanized rubber, and having at the same time some capacity to stretch, both of which qualities we take advantage of, or allow for. This we do by making the plunger of greater height than the degree to which it is actually desired to cup the article, and by providing the free air space between the cupped blank and article wall. The result is that after the blank has been forced by the former to the position shown in Fig. 6, the elasticity of the rubber retracts it until the said elasticity is balanced by the degree of vacuum behind it in the mold cavity, which position is shown in Fig. 7.

In other words, when the blank is forced inward and air expelled, owing to the space between the cupped blank and mold cavity, there is air remaining therein at atmospheric pressure. When the former is removed, the resiliency of the rubber enlarges this chamber, rarifying the air, so that as soon as the rarification equals the elasticity, the blank will be held in its final position by atmospheric pressure, and it is at this time that the two blanks are died together.

Before the dies can be brought together to trim the edges of the blanks and join such trimmed edges together the clamping rings and plungers must be removed from the die press. To prevent the upper blank from dropping away from the face of the upper die block when the clamping ring is removed, and also to insure the margins of the blanks being retained so firmly seated on both die blocks after removal of the clamping rings as to preclude the entry of air under the edges, the face of each die block is provided with a plurality of projections or pins $13^x$ and $14^x$ respectively, which penetrate the plastic stock and, by reason of the sticky nature thereof, cause it to be held firmly in intimate contact with the die faces. To effect the operation of the plungers or formers, we mount and manipulate these in the manner which will now be described.

Bolted or otherwise suitably secured to the lower portion of the press is a bracket or guide member 19 which has its upper portion formed as a guideway for a slide 20 mounted to move in a rectilinear path towards and from the dies, and designed to carry the clamping rings and formers, the slide being preferably supported by anti-friction rollers $20^x$.

This slide has a depending bracket or part $20^a$ to which are adjustably connected the outer ends of piston rods 21 by means of nuts $21^a$ threaded on said rod. These piston rods are provided with pistons $21^b$ working in the cylinders 22 and $22^a$ operated by fluid under pressure in the manner hereinafter described. The cylinders 22 and $22^a$ are preferably single acting cylinders having air outlet ports $22^x$ and $22^y$ in the ends opposite to those where the motor fluid is admitted, such outlet ports being provided with valves whereby the escape of air may be regulated and the speed of movement of the pistons regulated.

Slide 20 carries an upper frame 24 and a lower bracket member $24^a$ which support a vertical non-circular bar 25.

Frame member 24 also supports on its rear side fluid pressure cylinder 26 the function of which will hereinafter appear.

Figure 5:
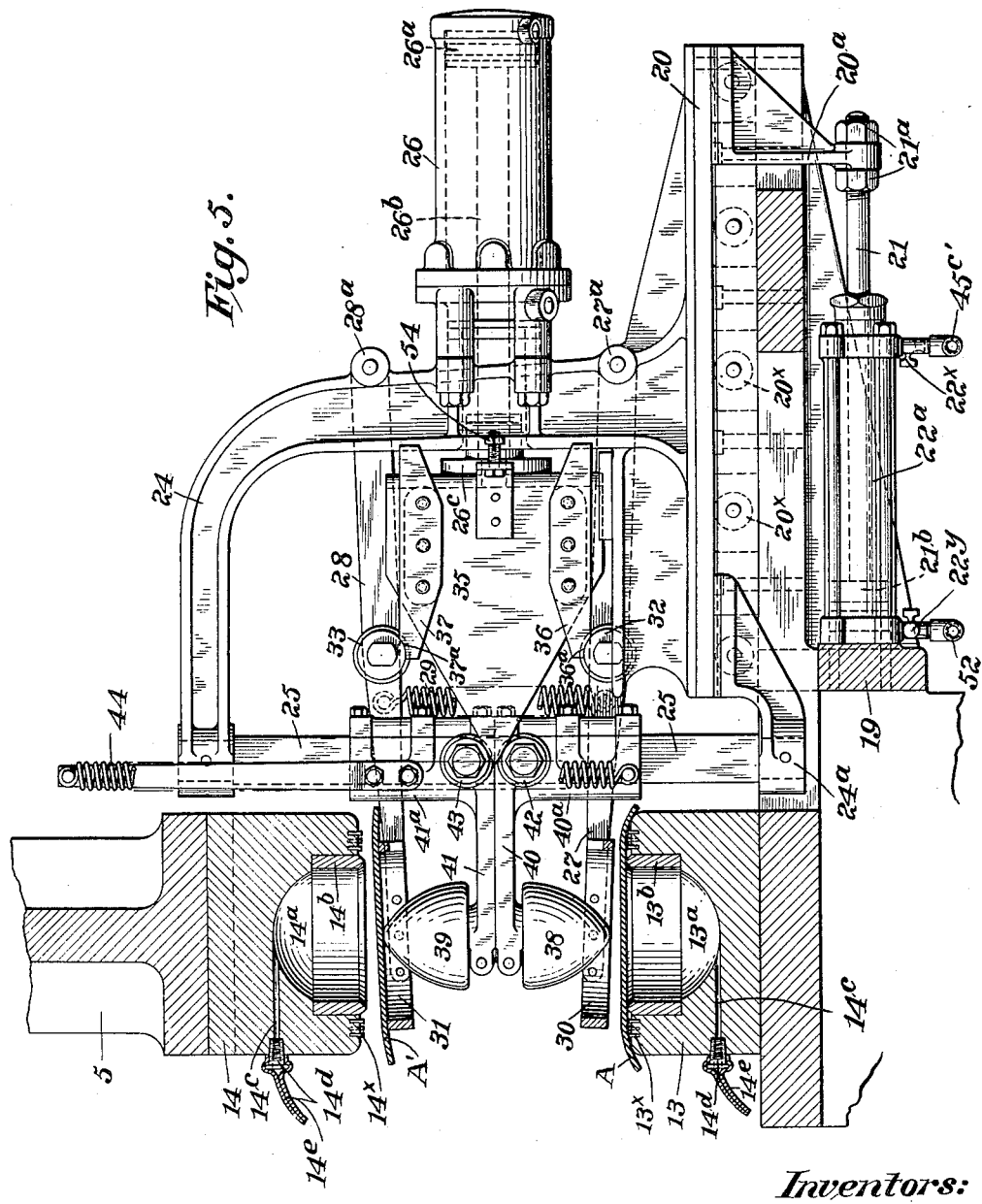
Fig. 5 is an enlarged detail view, partly in elevation and partly in section, showing the carriage advanced to bring the formers in line with the die cavities preparatory to cupping the blanks.

The clamping rings 30 and 31 hereinbefore described are carried by the forked ends of levers or arms 27 and 28 fulcrumed respectively at $27^a$ and $28^a$ on the frame member 24. These arms are normally pulled towards each other by a spring or springs 29 so as to be clear of the dies and in a position to freely enter and recede from the press, as shown in Fig. 5.

The arms are provided with anti-friction rollers 32 and 33 which are designed to coact with cam plates 36 and 37. The cylinder 26 is provided with a piston $26^a$ and rod $26^b$ which latter carries at its forward end a cross head $26^c$ on which are mounted a pair of spear shaped cams 35, to which cams the cams 36 and 37 are secured, or by which they are carried.

It will be noticed that the inclined cam faces of cams 36 and 37 are at the forward ends as indicated at $36^a$ and $37^a$, the remaining portions being straight and parallel to the line of movement of the piston, so that as fluid pressure is admitted to the piston and it moves towards the press the rollers will first ride up said inclines to force the arms or levers 27, 28 apart against the tension of the springs and cause the clamping rings to press the blanks against the die faces, and thereafter the rollers will travel along the horizontal parallel portions of the cams to hold the rings in clamping position while the piston continues to advance to operate the plungers or formers in the manner which will now be described.

The formers or plungers 38 and 39 are mounted on bracket arms or members 40 and 41 which have vertically elongated socket portions $40^a$ and $41^a$ slidably engaging and guided by the vertical non-circular bar 25 before referred to. They are respectively provided with pairs of anti-friction rollers 42 and 43 which are adapted to cooperate with the cams 35 above referred to, whose wedge shaped points enter between the upper and lower rollers and force them apart thus moving the former carrying members 40 and 41 vertically in opposite directions against the action of springs 44.

It is believed that the action of the mechanism thus far described will be clear from the foregoing, but it may be briefly stated as follows:

Assuming the upper die block to be elevated and the carriage retracted, an attendant places a blank of rubber A across the upper clamping ring 31 and a similar blank A over the lower die. Motor fluid (preferably compressed air) is then turned on by manipulating valve 45, preferably by a second operator.

This first brings the clamping rings and formers to the position shown in Fig. 5, and immediately thereafter, through the cam mechanism hereinbefore described, first causes the clamping rings to clamp or mechanically fasten the blanks to the die faces outside of or around the edges of cutting and joining rings, and then effects the separation of the formers whereby they enter the die cavities and cup the blanks. The reverse operation of the piston 26ᵃ causes the formers to be withdrawn from the die cavities and then the clamping rings to be removed from clamping position whereafter the slide or carriage is moved to its rearmost position to withdraw the clamping rings and formers from between the die blocks to permit them to come together and trim and join the edges of the cupped discs.

The movements of the carriage or slide and clamping rings and formers are controlled in the following manner. A four-way valve casing 45, see Fig. 1ᵃ, has a branch 45ᵃ connected by supply pipe 45ˣ with a suitable source of fluid under pressure (not shown) such for example as compressed air, an exhaust branch 45ᵇ, and branches connected by pipes 45ᶜ and 45ᵈ with the rear and front ends of cylinders 22ᵃ and 22 respectively. The valve 46 has two passages or ports, as shown in Fig. 1ᵃ, and an operating handle 46ᵉ which, when in its neutral position in said figure, cuts off the flow of fluid from the supply pipe. Movement of the handle to the left (Fig. 1ᵃ) places the supply in communication through pipes 45ᶜ and 45ᶜ', with cylinder 22ᵃ in rear of its piston to drive the latter forward and advance the carriage or slide to position the formers and clamping rings between the dies (Fig. 5), the valve at the same time placing pipe 45ᵈ in communication with the exhaust and hence allowing the air in front of piston in cylinder 22 to escape to the atmosphere.

When the carriage or slide reaches the limit of its forward movement an adjustable contact member 47 carried by a bar 48 rigidly connected with the carriage or slide contacts with the stem of a normally closed valve 49, commonly called a whistle valve, and opens the same, permitting the pressure fluid from pipe 45ᶜ to pass through flexible pipe 50 to the rear end of cylinder 26 driving its piston forward and operating the clamping rings and formers in the manner hereinbefore described.

The stock having been clamped and cupped, the operator then turns valve 46 to its full reversed position, placing pipe 45ᶜ in communication with the atmosphere and admitting pressure fluid to pipe 45ᵈ, which flows through flexible pipe 51 to the front end of cylinder 26 retracting its piston and hence moving the clamping rings and formers out of engagement with the die faces or again into the position shown in Fig. 5.

The supply of motive fluid to cylinder 22 from pipe 45ᵈ is by way of flexible pipe 51 above referred to and flexible pipe 52, but admission of pressure fluid to pipe 52 is normally cut off by a "whistle" valve 53, the stem of which is actuated by an adjustable contact member 54 secured in any suitable manner to one of the cams (35). When the carriage or slide reaches the limit of its rearward movement, this contact member or abutment opens the valve and admits motive fluid to the cylinder 22 retracting the carriage and withdrawing the formers and clamping rings from between the die faces.

The press is now ready to be actuated to die out the article sections and join the edges together, and this is accomplished by the operator throwing in the clutch 9 by means of the operating handle 9ᵃ. It is imperative that means should be provided which will prevent this being done until the clamping rings and formers are clear of the die faces.

To this end the hand lever 9ᵃ has pivotally connected therewith a short rod 55 which has its lower end slidably guided in a hole in a fixed bracket 56, a compression spring 57 encircling the rod and serving to normally keep the handle elevated. The bar 48 hereinbefore referred to is continued forward beneath the lower end of this pin and is provided with a hole 48ᵃ designed to align with the rod when the slide or carriage is in fully retracted position, at which time the clutch operating handle can be depressed, and at such time only. To prevent any danger of the operator having one of her hands between the dies when the same come together, we provide means requiring the use of both hands. This comprises a movable member 58 having a part normally lying beneath the lower end of rod 55 (Fig. 11) and connected to a second operating handle 59 so that the operator must first grasp said handle 59 and move it to bring hole 58ᵃ in line with the rod or plunger 55 before she can operate handle 9ᵃ with the other hand. A stop 58ᵇ limits the movement of member 58.

Figure 9:
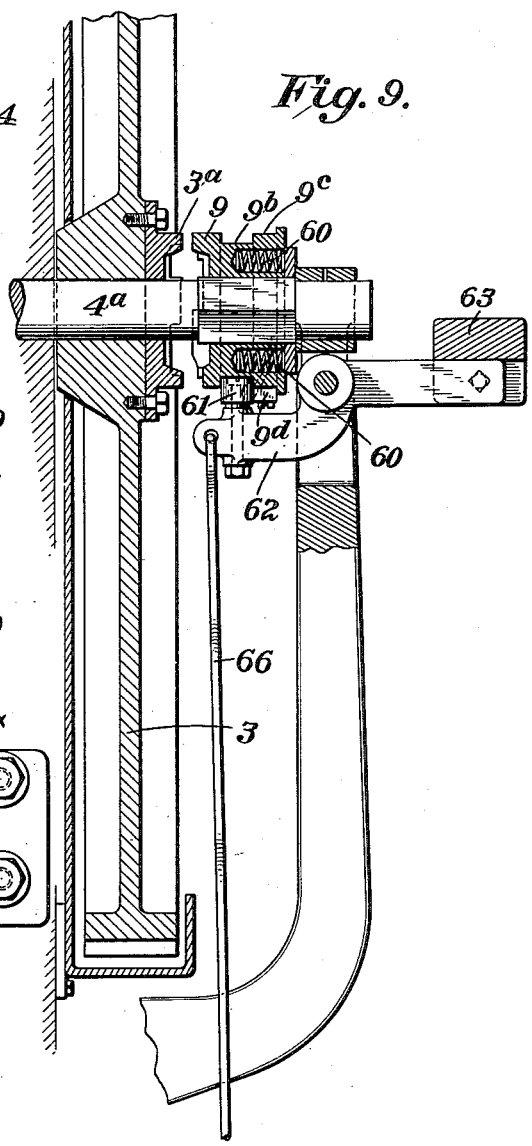
Fig. 9 is a detail sectional view of clutch and cooperating mechanism.

Gear 3 is loose on cam shaft 4ᵃ and is provided with a clutch member 3ᵃ fast thereon which cooperates with movable clutch member 9, which has a non-circular center fitting a non-circular portion of the shaft. Said movable clutch member is normally pressed towards member 3ª by springs 60 and has an annular groove 9ᵇ which is engaged by a detent in the shape of an anti-friction roller 61 carried by the one arm of a two-armed lever 62 fulcrumed on the machine frame, the other arm being weighted as indicated at 63 so as to normally hold the roller detent 61 in the groove 9ᵇ in which position the movable clutch member will be held out of engagement with clutch member 3ª, as shown in Fig. 9, and the press ram will be held stationary. Manipulation of handle 9ª as heretofore described, will, through rock shaft 64, arm 65 and pull rod 66, rock said lever 62 and withdraw the detent from the groove 9ᵇ, allowing the springs to press the movable clutch member into engagement with the clutch member on the gear, thereby setting the movable die in operation. Such movement of clutch member 9 brings the annular raised portion 9ᶜ in line with the roller detent. This raised portion is provided with a cam 9ᵈ which, at the completion of one rotation of the gear and clutch, which corresponds to one cycle of operation of the press ram or movable die, acts against the roller detent thereby disengaging the movable clutch member and allowing the press ram to stop in its elevated position, over-running being prevented by the brake heretofore described. The outward movement of the movable clutch member brings its annular groove into line with the roller detent which is immediately forced into said groove by the action of the weight.

It is desirable that means shall be provided to prevent any change of the carriage or slide being operated during the working stroke of the press die. To effect this the fluid pressure supply pipe 45ˣ is provided with a cut-off valve 67 having an operating handle 67ª and a tail 67ᵇ designed to coact with a projection or contact member 68 on the movable die member or plunger of the press. The operator having opened valve 67 to advance the carriage, this movement brings the tail 67ᵇ into the path of the contact member 68 which, on the descent of the press ram, closes the valve and cuts off the fluid pressure.

Figure 2:
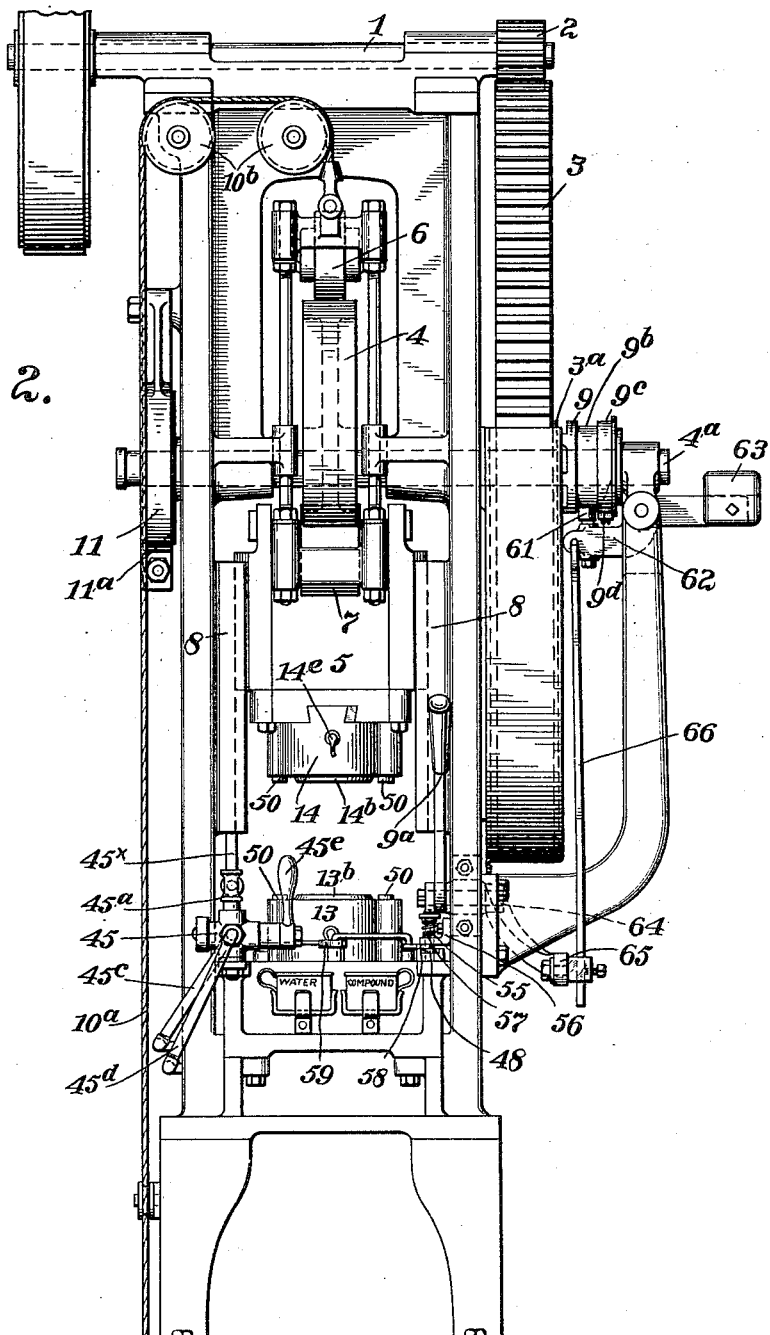
Fig. 2 is a front elevation, also partly broken away.
Figure 3:
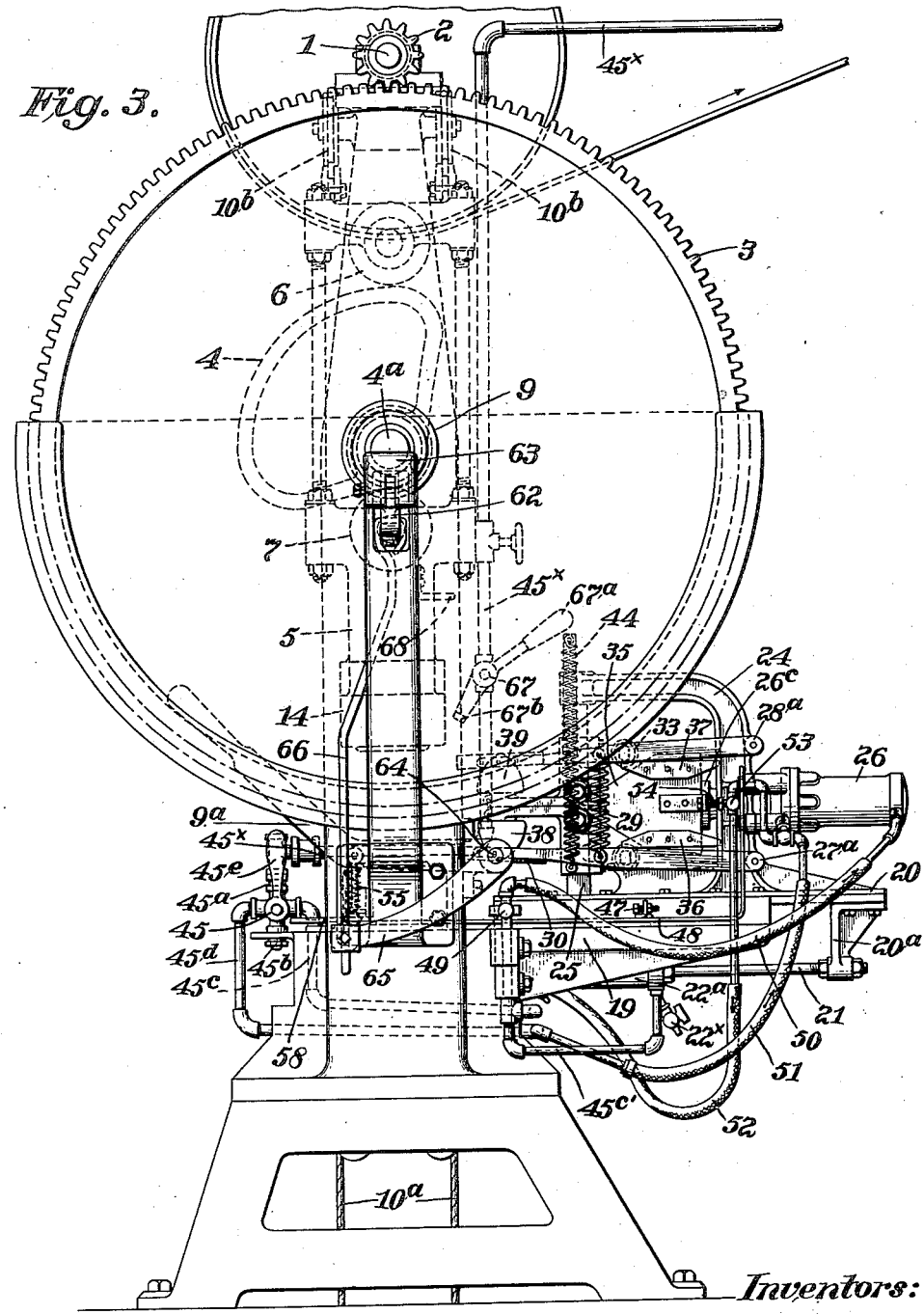
Fig. 3 is an elevation of the left-hand side of the machine, likewise partly broken away.
Figure 4:
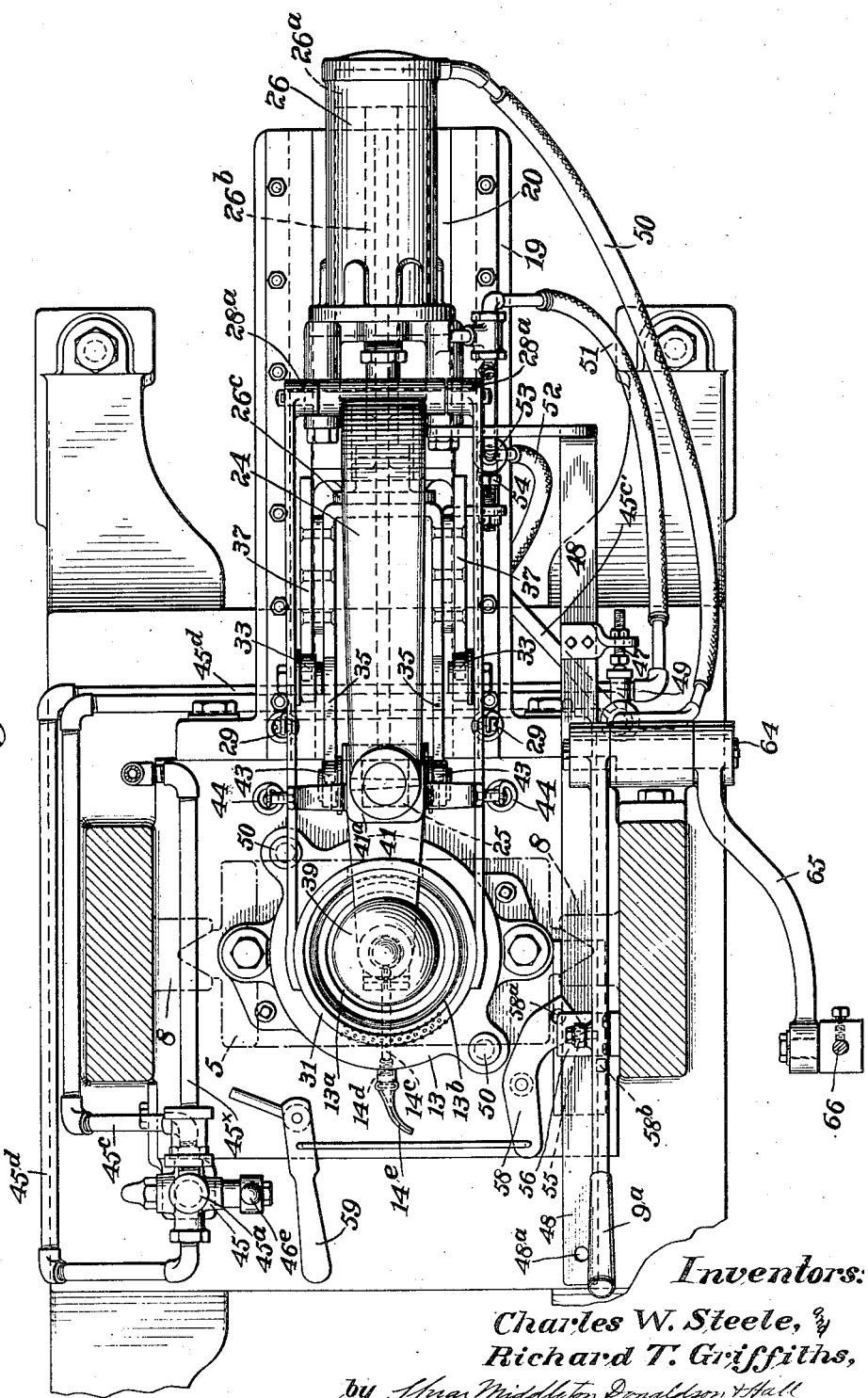
Fig. 4 is a plan view, partly in section.

After the blanks have been cupped, it is desirable that blower material be placed in the lower article section before the sections are died together, either water, a compound, or both, and to enable this to be readily done, we provide supporting brackets for receptacles which are shown in Fig. 2 and indicated by the words "Water" and "Compound" respectively. Instead of moving the slide or carriage by fluid pressure, this may be accomplished by hand, as shown in Fig. 13, by means of hand lever 70 fast on rock shaft 71 which carries an arm 72 connected by link 73 with the one end of lever 74 fulcrumed on bracket 75 and having its other end connected by link 76 with a fixed part on the carriage, forward movement of the carriage being limited to an adjustable stop 77.

We have found the best results to be secured by causing the ram to have a comparatively rapid movement during the greater part of its stroke but to have a slower movement when in proximity to the stock, the best effects being secured by having the ram pause or hesitate in its movement when about a quarter of an inch from the lower die, and to have a relatively slow movement for the remainder of its working stroke, thereby avoiding any bouncing effect and producing stronger seams.

Having thus described our invention, what we claim is:—

1. In apparatus of the class described, a die having a cavity, means for clamping a rubber blank across said cavity, and a former for cupping said blank of a smaller size than said cavity whereby the blank is shaped without contact with the cavity wall.

2. In apparatus of the class described, a die having a cavity, means for clamping a rubber blank across said cavity and a former for cooperating therewith of substantially the shape of the pointed end of an egg.

3. In apparatus of the class described, a die having a cavity, of substantially semi-spherical shape, means for clamping a rubber blank across said cavity, and forming means for cupping said blank, said forming means being substantially of the shape of one-half of a prolate spheroid.

4. In apparatus of the class described, a die having a cavity, means for clamping a rubber blank across said cavity, and a former for cupping said blank of a smaller size than said cavity whereby the blank is shaped without contact with the cavity wall, said cavity having an air vent provided with a non-return valve.

5. In apparatus of the class described, a mold member having a cavity, means for clamping a plastic blank across said cavity, and means for shaping said blank in said cavity without contact with the cavity wall, said cavity having an air vent provided with a non-return valve.

6. In apparatus of the class described, a mold member having a cavity, means for holding a rubber blank across said cavity by marginal engagement about said cavity, and means for mechanically forcing the intermediate portion of the blank into said cavity without contact with the cavity wall, said cavity having an air vent provided with a non-return valve.

7. In apparatus of the class described, a die having a cavity, and projections surrounding said cavity, means for forcing the margins of a rubber blank into engagement with said projections, and a former for pressing the sheet into the cavity.

8. In apparatus of the class described, a mold member having a cavity, and projections surrounding said cavity, means for forcing the margins of a rubber blank into engagement with said projections, and means for shaping the sheet in the cavity, without contact with the interior wall thereof.

9. In apparatus of the class described, a pair of coacting dies for simultaneously cutting plastic blanks from sheets and joining the edges thereof, said dies having die cavities, means for clamping said sheets to said dies about said cavities while the dies are separated, means for forcing the intermediate sheet portions into said cavities while so clamped to shape the same, said clamping and forcing means being removable, means for effecting mechanical engagement of the margins of said sheets with said dies about the cavities during and after removal of the clamping means, and means for causing the approach of the dies while the sheets are so held.

10. In apparatus of the class described, a pair of coacting dies for simultaneously cutting plastic blanks from sheets and joining the edges thereof, said dies having die cavities, annularly disposed sheet penetrating projections about said cavities for engaging marginal portions of the sheets, means for forcing the sheets into said cavities while so engaged to cup the same, said forcing means being removable, and means for causing the approach of the dies after removal of said forcing means.

11. In apparatus of the class described, a pair of coacting dies for simultaneously cutting plastic blanks from sheets and joining the edges thereof, said dies having die cavities, annularly disposed sheet penetrating projections about said die cavities, means for pressing the sheet margins into engagement with said projections, means for forcing the sheets into said cavities while so engaged to cup the same, said pressing and forcing means being removable, and means for causing the approach of the dies after removal of said pressing and cupping means.

12. In apparatus of the class described, a die block having a cavity, annularly arranged stock engaging projections around said cavity, means for causing marginal portions of a sheet of stock to be engaged by said projections, and means for deflecting an intermediate portion of said sheet into said cavity.

13. In apparatus of the class described, a die block having a die cavity and a cutting ring, a removable clamping ring for clamping a sheet across said cavity with means for operating it, a removable former for cupping said sheet, and means for effecting mechanical connection between the under surface of the sheet in line with said clamping ring and the surface of the die block.

14. In apparatus of the class described, a pair of cooperating press members having cavities, a carriage movable transversely to said members, a pair of clamping rings movably supported by said carriage for clamping plastic sheets across said cavities, a pair of sheet shaping devices also supported by said carriage, means for moving the carriage to enter said rings and shaping devices between the press members and remove them therefrom, and means for operating said rings and shaping devices when so entered.

15. In apparatus of the class described, a pair of cooperating die blocks having cutting and seaming rings and die cavities, a carriage movable transversely to said die blocks, a pair of clamping members movably supported by said carriage, a pair of shaping devices also supported by said carriage, means for moving the carriage to enter said rings and shaping devices between the dies and remove them therefrom, and means for operating said clamping members and shaping devices when so entered.

16. In apparatus of the class described, a die press having cooperating die blocks provided with die cavities, a carriage movable transversely to said die blocks, a pair of clamping members supported from said carriage, a pair of shaping devices also supported from said carriage, means for advancing and retracting said carriage, and means for automatically and successively actuating said clamping members and shaping devices.

17. In apparatus of the class described, a die press having cooperating die blocks provided with die cavities, a carriage movable transversely to said die blocks, a pair of clamping members supported from said carriage, a pair of shaping devices also supported from said carriage, means for advancing and retracting said carriage, and pneumatic means for actuating said clamping members and shaping devices.

18. In apparatus of the class described, a die press having die blocks provided with cavities, a carriage movable transversely towards and from said press, clamping devices and shaping devices supported by said carriage and entered and withdrawn by its movement relative to said die blocks, means for operating said devices, means for moving the carriage, and adjustable means for determining the limit of its advancing movement.

19. In apparatus of the class described, a die press having die blocks provided with cavities, a carriage movable transversely towards and from said press, clamping devices and shaping devices supported by said carriage and entered and withdrawn by its movement relative to said die blocks, means for operating said devices, means for moving the carriage, and means for locking the press against movement except when the carriage is in retracted position.

20. In apparatus of the class described, a die press having die blocks provided with cavities, a carriage movable transversely towards and from said press, clamping devices and shaping devices supported by said carriage and entered and withdrawn by its movement relative to said die blocks, means for operating said devices, means for moving the carriage, and means for rendering said operating means inoperative except when the carriage is in advanced position.

21. In apparatus of the class described, a press having members provided with cavities, a carriage movable transversely towards and from said press, clamping devices and shaping devices supported by said carriage and entered and withdrawn by its movement relative to said die blocks, means for moving the carriage, and means whereby the clamping devices and forming devices are automatically operated after the carriage reaches the limit of its forward movement.

22. In apparatus of the class described, a press having die members provided with cavities, a carriage movable transversely towards and from said press, clamping devices and shaping devices supported by said carriage and entered and withdrawn by its movement relative to said die blocks, means for moving the carriage, and means whereby said clamping and shaping devices are successively operated after the carriage reaches the limit of its forward movement and are operated in reverse order before the carriage begins its return movement.

23. The combination with a press having cavities and having operating means, of a carriage mounted to move towards and from said press, means for moving said carriage, a pair of vertically movable clamping members carried by said carriage, a pair of vertically movable shaping devices supported from said carriage, and cam devices for operating said clamping members and shaping devices.

24. The combination with a press having cavities and having operating means, of a carriage mounted to move towards and from said press, means for moving said carriage, a pair of vertically movable levers fulcrumed on said carriage and carrying clamping members, a pair of vertically movable shaping devices supported from said carriage, and cam devices for operating said levers and shaping devices.

25. The combination with a press having cavities and having operating means, of a carriage mounted to move towards and from said press, means for moving said carriage, a pair of vertically movable levers fulcrumed on said carriage and carrying clamping members, a pair of vertically movable shaping devices supported from said carriage, and successively acting cam devices for actuating said levers and said shaping devices.

26. The combination with a press having cavities and having operating means, of a carriage mounted to move towards and from from said press, means for moving said carriage, a pair of vertically movable levers fulcrumed on said carriage and carrying clamping members, a pair of vertically movable shaping devices supported from said carriage, a fluid pressure motive element mounted on said carriage, and cam devices operated by said element for actuating said levers and shaping devices.

27. The combination with a press of the class described, of a carriage movable transversely thereto, a pair of clamping devices supported from the carriage, and movable towards and from each other, a pair of shaping devices supported from the carriage and movable towards and from each other, a fluid pressure element on said carriage, and cam devices operated by said element for successively actuating said clamping and shaping devices.

28. The combination with a press of the class described, of a carriage movable towards and from the same with means for operating it, shaping devices supported from said carriage and movable towards and from each other, and means for moving said shaping devices.

29. The combination with a die press of the class described, of a carriage movable towards and from the same with means for operating it, shaping devices supported from said carriage and movable towards and from each other, and power operated means for moving said shaping devices.

30. The combination with a press of the class described, of a carriage movable towards and from the same with means for operating it, shaping devices supported from said carriage and movable towards and from each other, and fluid pressure actuated means for moving said shaping elements.

31. The combination with a press of the class described, of a carriage movable towards and from the same with means for operating it, a pair of clamping devices movably supported from said carriage, and means for operating said clamping devices.

32. The combination with a press of the class described, of a carriage movable towards and from the same with means for operating it, a pair of clamping devices movably supported from said carriage, and power operated means for operating said clamping devices.

33. The combination with a press of the class described, of a carriage movable towards and from the same with means for operating it, a pair of clamping devices movably supported from said carriage, and fluid pressure means for operating said clamping devices.

34. The combination with a press of the character described, of a carriage movable towards and from the same, a pair of levers pivoted on said carriage and carrying clamping devices, a vertical post supported by said carriage, a pair of shaping devices slidably supported from said post, cams slidably carried by said carriage for operating said levers and shaping devices, and means for moving said cams.

35. The combination with a press of the character described, of a carriage movable towards and from the same, a pair of levers pivoted on said carriage and carrying clamping devices, a vertical post supported by said carriage, a pair of shaping devices slidably supported from said post, cams slidably carried by said carriage for operating said levers and shaping devices, and power operated means for moving said cams.

36. The combination with a press of the character described, of a carriage movable towards and from the same, a pair of members on said carriage to be movable towards and from each other and carrying clamping devices, a pair of shaping devices supported on said carriage to move towards and from each other, cams slidably carried by said carriage for operating said members and shaping devices successively, and power operated means for moving said cams.

37. The combination with a press of the character described, of a carriage movable towards and from the same, a pair of members on said carriage movable towards and from each other and carrying clamping devices, a pair of shaping devices supported by said carriage and movable towards and from each other, cams movably carried by said carriage for operating said levers and shaping devices, and fluid pressure means for operating said members and shaping devices.

38. The combination with a press of the character described, of a carriage movable towards and from the same, a pair of levers pivoted on said carriage and carrying clamping devices, a vertical post supported by said carriage, a pair of shaping devices slidably supported from said post, cams slidably carried by said carriage for operating said levers and shaping devices, and fluid pressure means for moving said cams.

39. The combination with a press of the character described, of a carriage movable towards and from the same, a pair of levers pivoted on said carriage and carrying clamping devices, a vertical post supported by said carriage, a pair of arms slidably supported by said post, shaping devices carried by said arms, slidable cams cooperating with said levers and arms, and means for operating said cams.

40. The combination with a press of the character described, of a carriage movable towards and from the same, a pair of levers pivoted on said carriage and carrying clamping devices, a vertical post supported by said carriage, a pair of arms slidably supported by said post, shaping devices carried by said arms, slidable cams cooperating with said levers and arms, and power operated means for operating said cams.

41. The combination with a press of the character described, of a carriage movable towards and from the same, a pair of levers pivoted on said carriage and carrying clamping devices, a vertical post supported by said carriage, a pair of arms slidably supported by said post, shaping devices carried by said arms, slidable cams cooperating with said levers and arms, and a fluid pressure motor element carried by said carriage for operating said cams.

42. The combination with a press of the class described, of blank applying and shaping devices, a carriage supporting said devices mounted to move towards and from the press, for positioning said devices, a fluid pressure motor element supported by the carriage and having operating connections to said devices, fluid supply and outlet pipes for said motor element with means for controlling the same, and a cut-off valve for said fluid supply with means for automatically operating the same.

43. The combination with a press of the class described, of blank applying and shaping devices, a carriage supporting said devices mounted to move towards and from the press for positioning said devices, a fluid pressure motor element supported by the carriage and having operating connections to said devices, fluid supply and outlet pipes for said motor element with means for controlling the same, a cut-off valve for said supply pipe, and means controlled by the press for operating said valve.

44. The combination with a press of the class described, of blank applying and shaping devices, a carriage supporting said devices mounted to move towards and from the press for positioning said devices, a fluid pressure motor element supported by the carriage and having operating connections to said devices, a fluid pressure motor for operating said carriage, fluid supply and outlet pipes for said motor elements, a single manual control valve for said pipes, and means for automatically timing the operation of the first named motor relative to the second motor.

45. The combination with a press of the class described, of blank applying and shaping devices, a carriage supporting said devices mounted to move towards and from the press for positioning said devices, a fluid pressure motor supported by the carriage and having operating connections to said devices, a fluid pressure motor for operating the carriage, fluid supply and outlet pipes for said motor elements, manual means for controlling the same, and means whereby the motive fluid is automatically admitted to said first named motor only at the extremity of the forward movement of the carriage.

46. The combination with a press of the class described, of blank applying and shaping devices, a carriage supporting said devices mounted to move towards and from the press for positioning said devices, motor means on the carriage for operating said devices, motor means for operating said carriage, a single controlling device for supplying power to both said motor means, means for automatically supplying power to said just named motor only at the completion of the forward movement of the carriage, and means whereby return movement of the carriage is prevented until reverse movement of the applying and shaping devices has been effected.

47. The combination with a press of the class described, of blank applying and shaping devices, a carriage supporting said devices mounted to move towards and from the press, fluid pressure motor means for operating said carriage, fluid pressure motor means on the carriage for operating said devices in one direction, a fluid pressure supply pipe for supplying fluid to said first named motor means to advance the carriage, a normally closed branch pipe from said supply pipe to said second motor means for operating the latter in one direction, means for automatically opening said normally closed supply pipe at the limit of the forward movement of the carriage, a fluid pressure supply pipe to said second named motor means for operating said devices in a reverse direction, a normally closed branch pipe leading to said first named motor means for supplying fluid to retract the carriage, and means for automatically opening said last named normally closed branch after the said devices have been operated in said reverse direction.

48. The combination with a press of the class described, of blank applying and shaping devices, a carriage supporting said devices mounted to move towards and from the press, a single acting fluid pressure motor for advancing the carriage, a single acting fluid pressure motor for retracting the carriage, a double acting fluid pressure motor for operating said devices, a fluid pressure supply pipe to said first named single acting motor, a normally closed branch pipe to one end of said double acting motor, means for opening said branch pipe automatically at the limit of the advance movement of the carriage to operate said devices in one direction, a fluid pressure supply pipe to said second single acting motor, a normally closed branch pipe to the opposite end of said double acting motor for operating said devices in the opposite direction, means for automatically opening said last named branch pipe after said devices have been operated in said reverse direction, and means for controlling the admission of fluid pressure to and its exhaust from said supply pipes.

49. The combination with a press of the class described, of a carriage mounted to move towards and from the press, blank manipulating devices movably supported by the carriage, a double acting fluid pressure motor on the carriage, cam means actuated by said double acting motor for operating said devices, a pair of single acting fluid pressure motors for moving said carriage, a fluid pressure supply pipe to one of said single acting motors, a branch pipe leading to one end of said double acting motor, a normally closed valve for said branch pipe, means on the carriage for automatically opening said valve on movement of the carriage in one direction, a pressure fluid supply pipe to the opposite end of said double acting motor for operating said cam means in a reverse direction, a branch pipe to the other of said single acting motors, a normally closed valve for said last named branch pipe, means controlled by the reverse movement of said cam means for opening said valves, and valve means for controlling the admission of pressure fluid to and its exhaust from said pressure fluid supply pipes.

50. The combination with a press having a movable die member, means for operating the same, a carriage movable towards and from the press, blank manipulating devices supported by said carriage, a clutch for controlling the operation of the press, and means for preventing operation of said clutch when the carriage is advanced.

51. The combination with a press having a movable die member, means for operating the same, a carriage movable towards and from the press, blank manipulating devices supported by said carriage, a clutch for controlling the operation of the press, a lever for operating said clutch, and a member connected by the carriage and arranged to obstruct movement of said lever except when the carriage is in retracted position.

52. The combination with a press having a movable die member, means for operating the same, a carriage movable towards and from the press, blank manipulating devices supported by said carriage, a clutch for controlling the operation of the press, a lever for operating said clutch, a plunger connected with said lever, and a longitudinally movable bar beneath said detent and connected to move in unison with said carriage, said bar having a passage to align with said plunger.

53. The combination with a press having a movable die member, means for operating the same, a carriage movable towards and from the press, blank manipulating devices supported by said carriage, a clutch for controlling the operation of the press, a hand lever for operating said clutch, a device controlled by the movement of the carriage for normally obstructing movement of said hand lever, a second device for obstructing the movement of said lever, and a hand lever for operating said last named device.

In testimony whereof, we affix our signatures.

CHARLES W. STEELE.
RICHARD T. GRIFFITHS.